(12) United States Patent
Champion et al.

(10) Patent No.: US 7,063,909 B2
(45) Date of Patent: Jun. 20, 2006

(54) FUEL-CELL ELEMENT STACK WITH STRESS RELIEF AND METHODS

(75) Inventors: David Champion, Lebanon, OR (US); Jonald R. Gradwohl, Corvallis, OR (US); Peter Mardilovich, Corvallis, OR (US); Christopher Beatty, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/350,467

(22) Filed: Jan. 23, 2003

(65) Prior Publication Data

US 2004/0033404 A1 Feb. 19, 2004

Related U.S. Application Data

(63) Continuation-in-part of application No. 10/269,771, filed on Oct. 10, 2002, which is a continuation-in-part of application No. 10/219,507, filed on Aug. 14, 2002.

(51) Int. Cl.
*H01M 2/00* (2006.01)
*H01M 4/00* (2006.01)
*H01M 8/10* (2006.01)

(52) U.S. Cl. ............... 429/34; 429/66; 429/32
(58) Field of Classification Search ................ 429/34, 429/66, 32, 26, 37
See application file for complete search history.

(56) References Cited

U.S. PATENT DOCUMENTS

| 4,699,853 | A | 10/1987 | Okada et al. ............... 425/261 |
|---|---|---|---|
| 5,270,131 | A * | 12/1993 | Diethelm et al. .............. 429/34 |
| 5,679,482 | A | 10/1997 | Ehrenberg et al. .......... 429/249 |
| 5,750,280 | A | 5/1998 | Akagi .......................... 429/32 |
| 5,789,091 | A | 8/1998 | Wozniczka et al. ........... 429/12 |
| 5,993,987 | A | 11/1999 | Wozniczka et al. ........... 429/37 |
| 6,365,293 | B1 * | 4/2002 | Isono et al. ................... 429/30 |
| 6,416,897 | B1 | 7/2002 | Tomlins et al. ............... 429/31 |
| 6,455,179 | B1 | 9/2002 | Sugita et al. ................. 429/12 |
| 6,815,116 | B1 * | 11/2004 | Lenz et al. ................... 429/38 |
| 6,838,204 | B1 * | 1/2005 | Brudnicki .................... 429/34 |
| 2002/0127459 | A1 | 9/2002 | Lenz et al. ................... 429/34 |

FOREIGN PATENT DOCUMENTS

| EP | 1300902 | * | 4/2003 |
|---|---|---|---|
| WO | WO 02/17419 A2 | | 2/2002 |
| WO | WO 02/078111 A2 | | 10/2002 |

* cited by examiner

*Primary Examiner*—Patrick Joseph Ryan
*Assistant Examiner*—Thomas H. Parsons

(57) ABSTRACT

A fuel-cell assembly has a plurality of unit cells, each of the unit cells comprising an anode, an electrolyte, a cathode, and a current collector. The fuel-cell assembly has a plurality of electrical interconnection elements, at least one electrical interconnection element being connected respectively to each anode, to each cathode, and to each current collector of the unit cells. The unit cells are arranged in a stack and are mechanically supported by electrical interconnection elements such that each of the unit cells of the stack has at least one edge free to move relative to the electrical interconnection elements.

35 Claims, 5 Drawing Sheets

FUEL-CELL ELEMENT STACK WITH STRESS RELIEF AND METHODS

CROSS-REFERENCE TO RELATED APPLICATION

This application is a continuation-in-part of co-pending and commonly assigned application Ser. No. 10/269,771 filed Oct. 10, 2002, which is in turn a continuation-in-part of co-pending and commonly assigned application Ser. No. 10/219,507, filed Aug. 14, 2002, the entire disclosure of each of these applications being incorporated herein by reference.

TECHNICAL FIELD

This invention relates to fuel cells and more particularly to stress relief in MEMS-based fuel-cell structures and related methods.

BACKGROUND

Various portable devices, such as laptop computers, personal digital assistants (PDA's), portable digital and video cameras, portable music players, portable electronic games, and cellular phones or other wireless devices, require portable power sources. The weight and inconveniences of single-use batteries and rechargeable batteries have motivated efforts to replace those power sources for portable use. Thus, there is an increasing demand for light-weight, reusable, efficient, and reliable power sources in such applications and in many other applications as well. In attempts to meet these needs, various portable fuel cells have been developed, such as ceramic-based solid-oxide fuel cells, direct methanol fuel-cell (DMFC) systems, reformed-methanol-to-hydrogen fuel-cell (RMHFC) systems, and other proton-exchange-membrane (PEM) fuel-cell systems. Microscale design principles have been applied to the design of portable fuel cells to provide improved power density and efficiency and to provide lower cost. However, microscale designs can be susceptible to thermally-induced mechanical stress. There is a continuing need and a large anticipated market for improved practical compact portable fuel cells with rapid startup times and improved efficiency. There is a particular need for compact portable fuel cells with improved relief of thermally-induced mechanical stress.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Throughout this specification and the appended claims, the term "fuel cell" means a fuel cell in its usual meaning or a battery cell having at least one each of an anode, a cathode, and an electrolyte. A "unit cell" is one cell comprising an anode, a cathode, and an electrolyte. The term "MEMS" has its conventional meaning of a micro-electro-mechanical system. The term "lateral" is used to mean generally parallel to the principal plane of a generally planar unit cell. For clarity of the description, the drawings are not drawn to a uniform scale. In particular, vertical and horizontal scales may differ from each other and may vary from one drawing to another.

Figure 1:
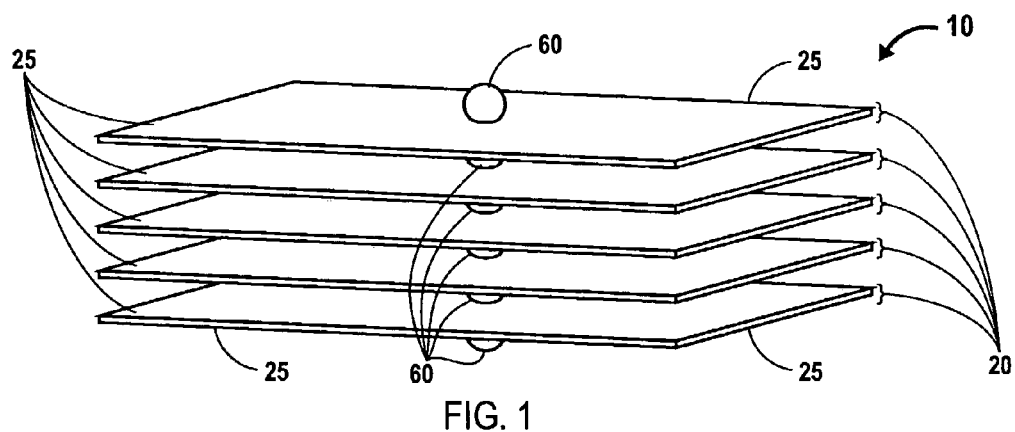
FIG. 1 is a perspective view illustrating a first embodiment of a fuel-cell element stack made in accordance with the invention.
Figure 2A:
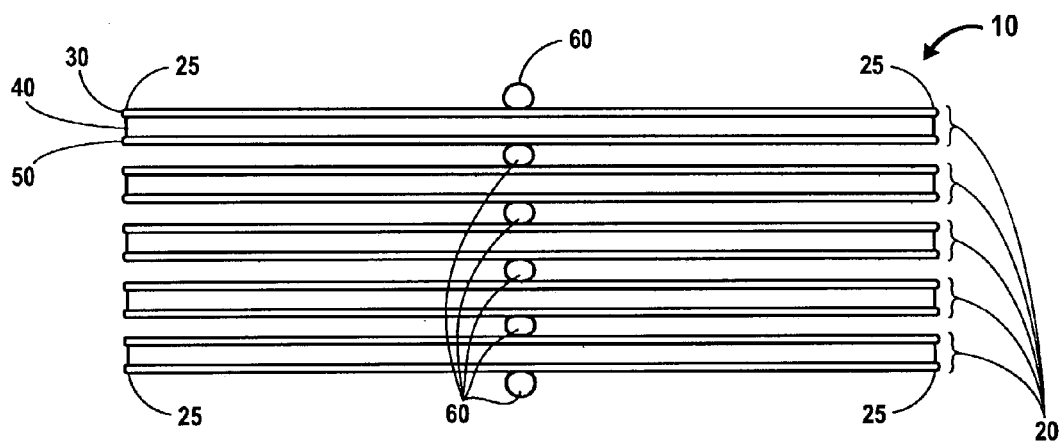
FIG. 2A is a cross-sectional side elevation view of the embodiment of FIG. 1.
Figure 2B:
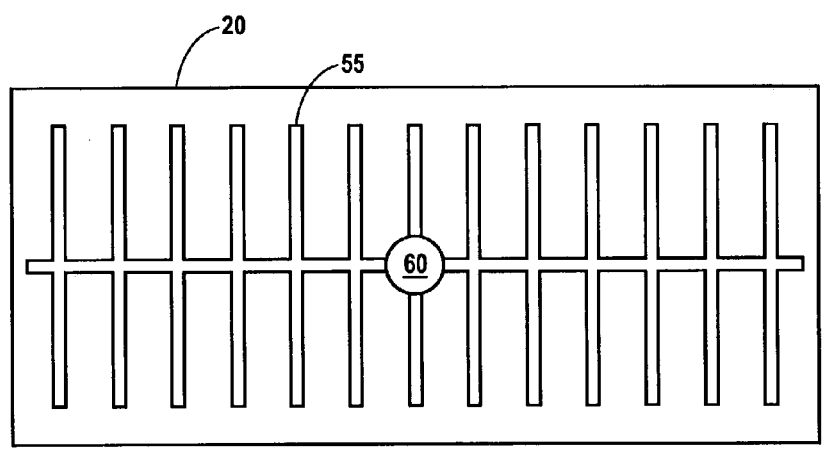
FIG. 2B is a top view of the embodiment of FIG. 1.
Figure 3:
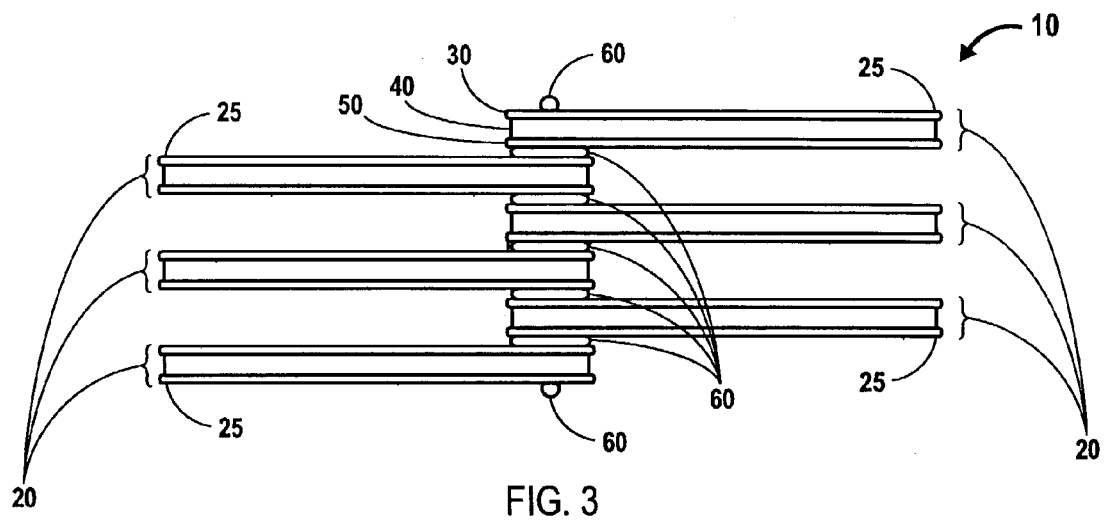
FIG. 3 is a cross-sectional side elevation view illustrating a second embodiment of a fuel-cell element stack made in accordance with the invention.

One aspect of the invention is a fuel-cell stack 10 comprising a number of unit cells 20 connected together. A first embodiment of such a fuel-cell stack 10 is shown in FIGS. 1, 2A, and 2B. A second embodiment of such a fuel-cell stack 10 is shown in FIG. 3. In the embodiment of FIGS. 1, 2A, and 2B, the unit cells 20 are vertically aligned with each other. In the embodiment of FIG. 3, unit cells 20 are staggered, i.e., alternate unit cells extend in opposite directions.

Each unit cell has an anode 30, a cathode 50, and an electrolyte 40 in contact with the anode and cathode. As shown in FIG. 2B, each unit cell may also have a current collector 55. The unit cell may be a MEMS-based unit cell in which MEMS techniques are used to make the anode 30, cathode 50, electrolyte 40 and current collector 55. As described in the parent applications incorporated by reference, any of the three elements, anode 30, electrolyte 40, or cathode 50, may support the other two elements of the unit cell. While the unit cell embodiments shown in 1, 2A, 2B, and 3 have the anode 30 at the top, the cathode 50 at the bottom and the electrolyte 40 in the middle of each unit cell, that configuration is shown for illustrative purposes only and is not intended to be limiting of the invention. A person skilled in the art will readily recognize from the detailed descriptions of the applications incorporated herein by reference that various other configurations of each unit cell may be made.

Each unit cell 20 of stack 10 has electrical interconnection elements 60, at least one electrical interconnection element 60 being connected to each anode 30 and to each cathode 50 respectively. The unit cells 20 are also mechanically supported by electrical interconnection elements 60. Each unit cell 20 has at least one edge 25 free to move relative to electrical interconnection elements 60. In the embodiment of 1, 2A, and 2B, the electrical interconnection elements 60 of unit cells 20 are vertically aligned with each other. In the embodiment of FIG. 3, the electrical interconnection elements 60 are vertically aligned with each other, although unit cells 20 are staggered, extending alternately in opposite directions from the common alignment axis of the electrical interconnection elements 60 by which unit cells 20 are mechanically supported. However, it is not generally necessary for all the electrical interconnection elements 60 to be vertically aligned along a single common axis. Various arrangements of the electrical interconnection elements 60 may be used, with various degrees of alignment.

Each of the electrical interconnection elements 60 may be a conductive pin, for example, mounted in a conventional pin opening (not shown) in each unit cell 20. Many suitable interconnection pin materials and configurations are known in the art. The material should have good electrical conductivity and a thermal expansion coefficient that is similar to the overall thermal expansion coefficient of the unit cells 20. The material should also be catalytically inert. In the embodiments illustrated in FIGS. 1, 2A, 2B, and 3, each of the electrical interconnection elements 60 is a ball bond, e.g., a gold ball. Such an interconnection element has advantages, including the inertness and relative softness of gold and a relatively small contact area with unit cell 20. However, it is not required that the spherical shape be retained. Square, rectangular, triangular, or other shapes may be used for electrical interconnection elements 60 if convenient. As shown in FIG. 3, the interior electrical interconnection elements 60 may be flattened when the stack 10 is compressed.

As shown in FIGS. 1, 2A, 2B, and 3, unit cells 20 have four edges 25 free to move relative to electrical interconnection elements 60. It will be readily understood that a mechanical constraint of any of the edges 25 could reduce the number of edges free to move, but it is desirable to leave at least one edge 25 of each unit cell unconstrained and free to move relative to electrical interconnection elements 60. Thus, various embodiments like those of FIGS. 1, 2A, 2B, and 3 may have one, two, three or four edges 25 free to move relative to electrical interconnection elements 60. An example of an embodiment with only one edge 25 free to move is one with circular or elliptical unit cells, in which the entire periphery may be considered one edge.

In the embodiments illustrated in FIGS. 1, 2A, 2B and 3, each of the unit cells 20 is cantilevered from the electrical interconnection elements 60 by which it is mechanically supported. The electrical interconnection elements 60 are disposed between the unit cells of each pair of adjacent unit cells, and each electrical interconnection element 60 is shared by the two adjacent unit cells.

Figure 4A:
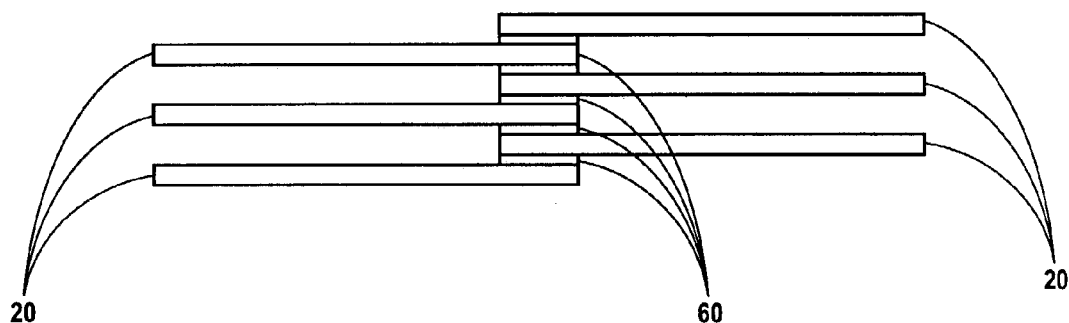
FIG. 4A is a cross-sectional side elevation view of a third embodiment.
Figure 4B:
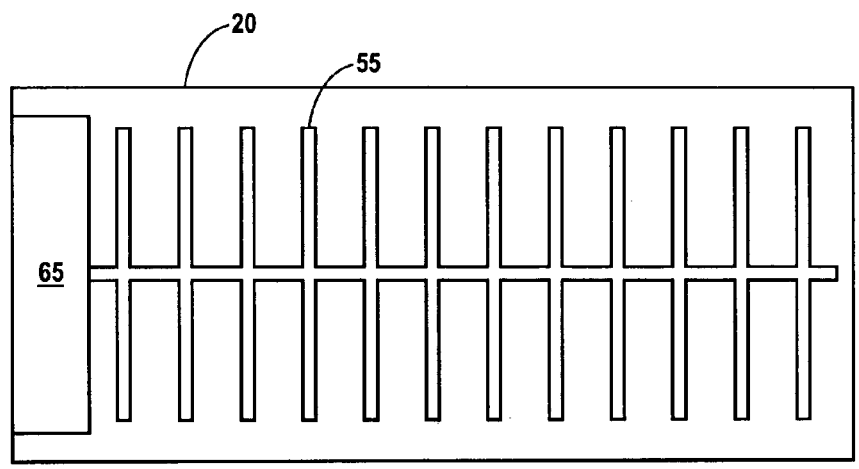
FIGS. 4B and 4C are top views of alternate unit cells of the third embodiment.
Figure 4C:
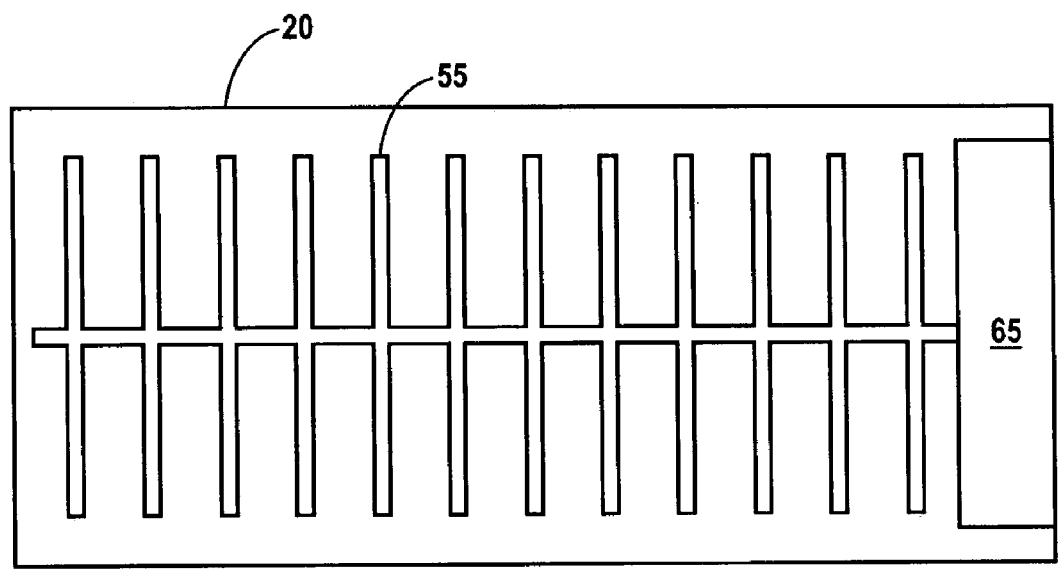

A third embodiment is shown in FIGS. 4A–4C. As in FIG. 3, the embodiment of FIG. 4A also has unit cells 20 staggered, i.e., alternate unit cells extend in opposite directions. In this embodiment, the unit cells are supported by bond-pad interconnection elements 65, which connect both electrically and mechanically to current collectors 55. In this embodiment, the unit cells 20 are cantilevered from the bond-pad interconnection elements 65. The particular dual-comb-shaped configurations of current collectors 55 shown in FIGS. 2B, 4B, and 4C are illustrative of a particular design choice for a current collector and should not be considered limiting of the invention. A person skilled in the art will recognize that many other useful design configurations may be used besides the layout shown in the drawings.

It will also be recognized that many types of electrical interconnection elements 60 or 65 are suitable, depending on the application, the temperature ranges occurring during startup and operation of the fuel-cell stack, etc. Types of electrical interconnections that are suitable in various applications include ball bonds, bond pads, pins, clips, nail-head bonds, wire bonds, ultrasonic bonds, solder bonds, controlled-collapse bonds, surface-mount bonds, brazed bonds, compression bonds, and welded bonds, for example.

Figure 5:
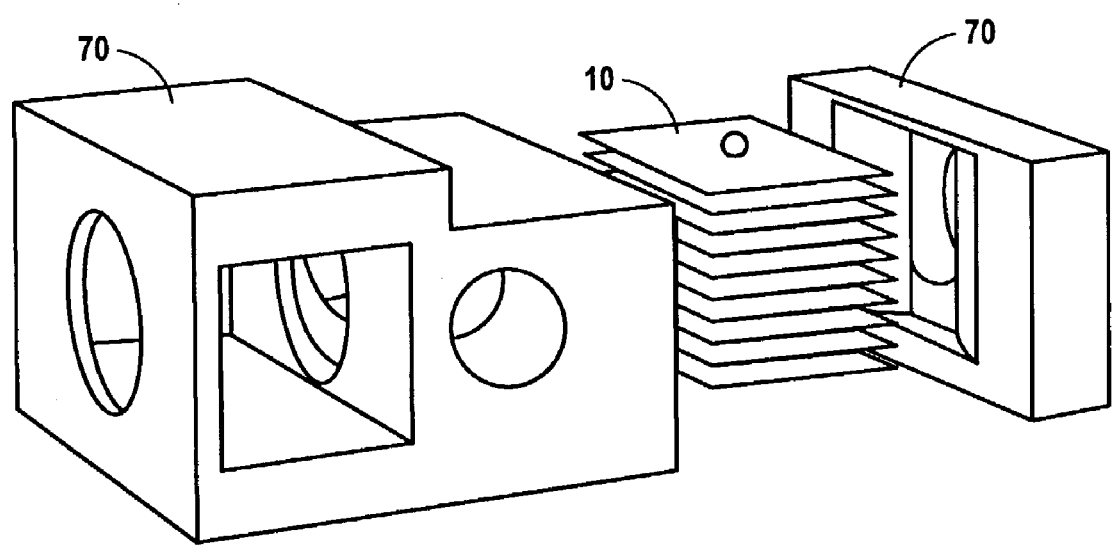
FIG. 5 is an exploded perspective view illustrating an embodiment of a fuel-cell assembly made in accordance with the invention and employing an embodiment of a fuel-cell element stack made in accordance with the invention.

FIG. 5 illustrates schematically an exploded perspective view of major components of a fuel-cell assembly, in which the stack 10 of unit cells is held in a housing or fixture 70 that has openings or slots for supplying fuel and air or other source of oxidant. Not shown in FIG. 5 are leads for current collection from the fuel cell, fasteners, and mounting hardware, for example.

Figure 6:
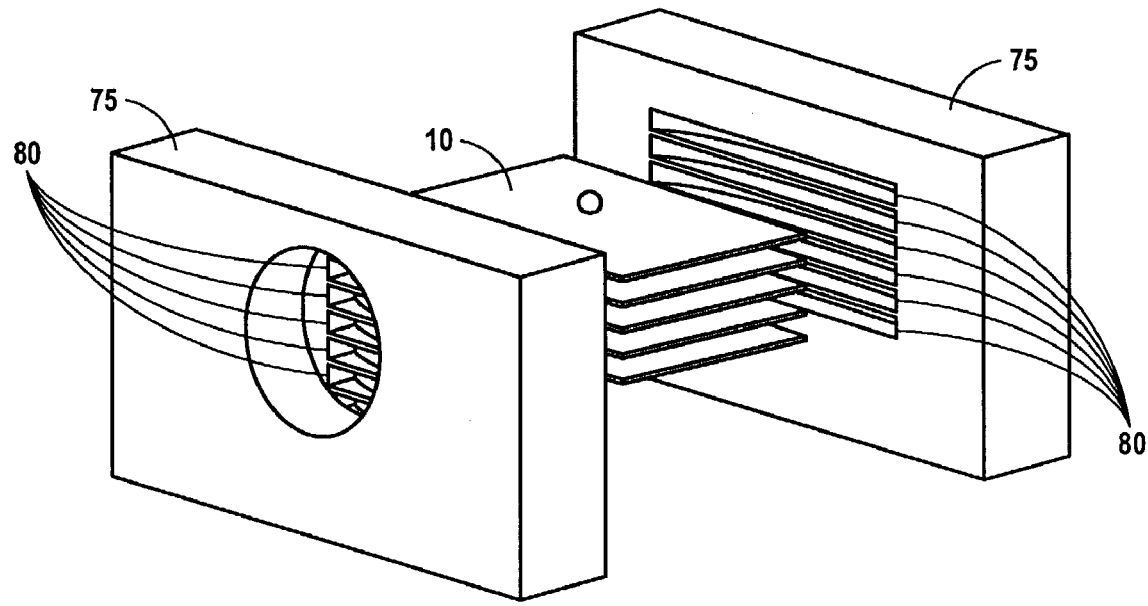
FIG. 6 is an exploded perspective view of a portion of an embodiment of a fuel-cell assembly, illustrating details thereof.

As shown in FIG. 6, a fixture 75 may be provided, having slots 80 for gas flow.

Figure 7:
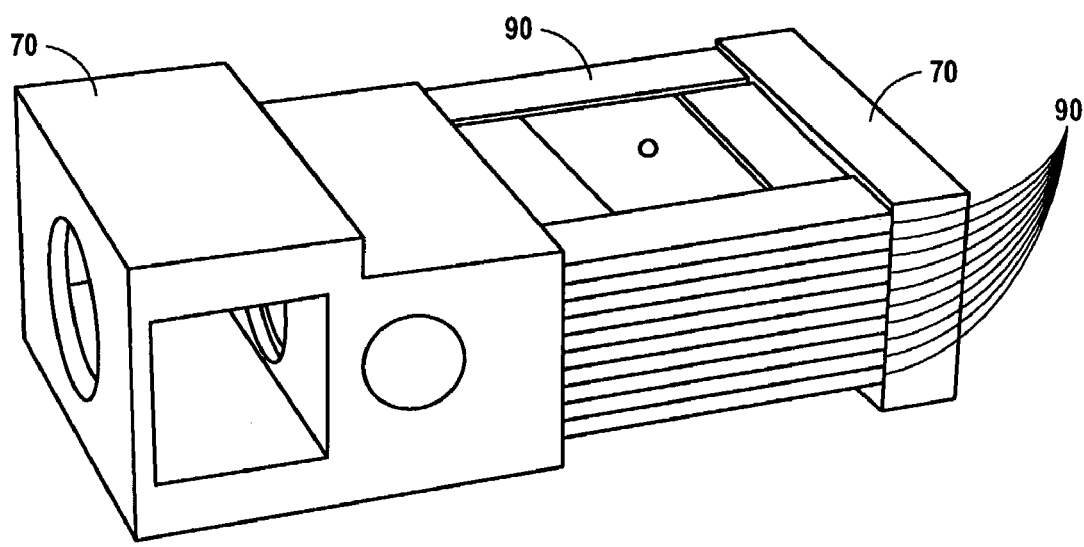
FIG. 7 is a perspective view of an embodiment of a fuel-cell assembly, illustrating additional details thereof.

In operation each unit cell 20 has an operable range of thermal expansion determined by the temperature range reached and the thermal expansion coefficients of the various constituents. The fuel-cell assembly is configured so that the edges 25 that are free to move laterally relative to electrical interconnection elements 60 remain free to move laterally throughout the entire operable range of thermal expansion. For example, as shown in FIG. 7, a housing or fixture 70 may be provided, having trays 90 adapted to receive portion(s) of each unit cell 20 including the edge(s) 25 that are free to move laterally relative to interconnection elements 60. Thus, each of the movable edges 25 is loosely (i.e., movably) positioned in one of the trays 90 of fixture 70. Fixture 70 has vent openings to allow adequate flow of fuel and an adequate oxidant source such as air flow across the unit cells. Not shown in FIGS. 5–7 are conventional thermocouples that may be used for monitoring stack temperatures and heaters that may be used for heating the unit cells.

As temperatures vary during start-up, operation, and shut-down of the fuel cell assembly, the unit cells may expand and contract within fixture 70 in accordance with the composite thermal expansion coefficients. Throughout the operable temperature range, the freely movable edges 25 remain laterally unconstrained, thus preventing stresses that would otherwise accompany the thermal expansion.

FIG. 7 illustrates another embodiment of a fuel cell assembly. In the embodiment of FIG. 7, stacking trays 90 also provide alignment of the unit cells, during bonding of the stack. As shown in FIG. 7, each stacking tray 90 has top and bottom openings large enough to allow interconnection elements 60 to extend through the openings throughout the stack. The openings are symmetric in shape and size. Thus, while only the top opening is visible in FIG. 7, the bottom opening is identical to the top opening in this embodiment. Stacking trays 90 also have internal slots (not visible in FIG. 7). As shown in FIG. 7, stacking trays 90 may be left in place when stack 10 is assembled into housing 70, maintaining alignment of the unit cells 20 while allowing lateral expansion of the edges 25 within their individual internal slots. As will be readily understood by those skilled in the art, the height of the internal slot of each stacking tray 90 may be chosen to limit out-of-plane bending of the unit cell and to limit motion of the unit cell more or less perpendicular to its principal plane due to non-uniform thermal expansion or contraction, while still allowing lateral expansion or contraction substantially parallel to the unit cell's principal plane.

Thus, one aspect of the invention may be embodied in a fuel-cell assembly that has elements for generating electric current. Each of these current-generating elements includes an anode, an electrolyte, and a cathode, and may include a current collector. The fuel-cell assembly also has elements for electrically interconnecting the current-generating elements. At least one of those interconnecting elements is connected to each anode, and at least one of the interconnecting elements is connected to each cathode. Electrical interconnecting elements are also connected to the current collector if one is present. The current-generating elements are mechanically supported by the electrical interconnecting elements, such that each of the current-generating elements has at least one edge free to move relative to the electrical interconnecting elements. In this fuel-cell assembly, each of the current-generating elements has an operable range of thermal expansion. Each edge that is free to move relative to the electrical interconnecting elements remains free to move throughout the operable range of thermal expansion.

Various embodiments illustrate two useful features: the support of each unit cell of a stack by fixed electrical interconnections which also serve as mechanical supports, and the freedom of lateral expansion/contraction of the unit cells, while limiting the range of bending or motion of the unit cells in directions more or less perpendicular to the surface of each unit cell. The latter feature is illustrated by stacking trays 90, for example.

Fixture 75 has a tray 90 for each unit cell 20. Each unit cell is positioned with a portion of the unit cell (including edge 25) in an internal slot of tray 90, loosely enough positioned so that the edge 25 of unit cell 20 may move freely in lateral directions in response to thermal expansion, but the internal slot limits out-of-plane bending and motion of the unit cell. It will be understood that each of the unit cells has an operable range of thermal expansion and that the portion of unit cell 20 in tray 90 remains within tray 90 throughout the operable range of thermal expansion. Thus, each tray 90 is adapted to receive a unit cell of the stack, and tray 90 may be used to limit out-of-plane bending and motion while allowing lateral motion of unit cell edges 25 due to thermal expansion.

Fabrication

Figure 8:
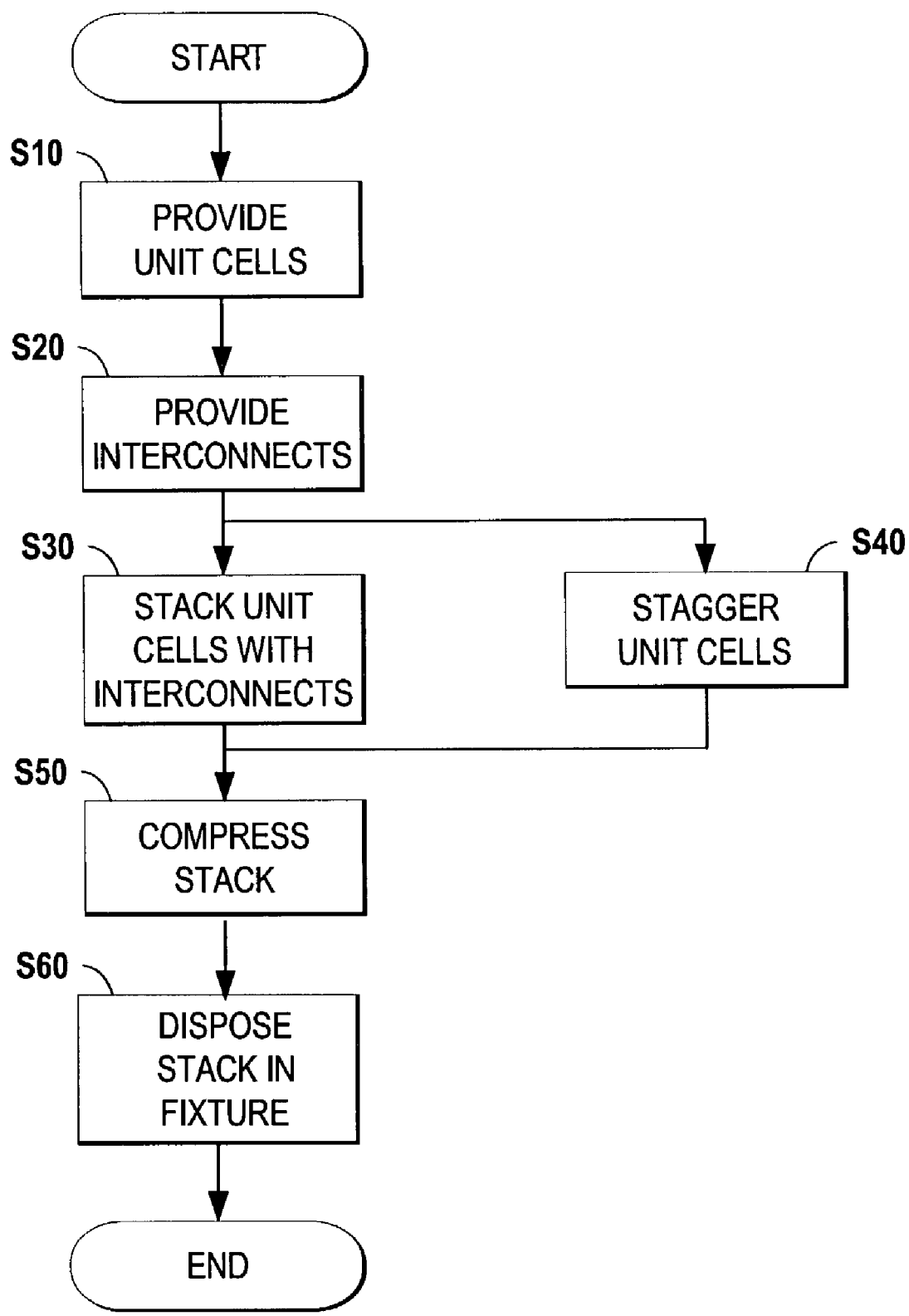
FIG. 8 is a flowchart illustrating an embodiment of methods performed in accordance with the invention.

Another aspect of the invention is a method for fabricating fuel-cell assemblies. An embodiment for such a method for fabricating the fuel-cell assembly is illustrated by the flowchart of FIG. 8. The method includes the steps of (S10) providing a multiplicity of fuel-cell unit cells 20 (each fuel-cell unit cell comprising an anode 30, an electrolyte 40, and a cathode 50); (S20) providing interconnection elements 60 adapted to connect to the anode 30 and cathode 50 of each of the unit cells; (S30) assembling a stack 10 by stacking the multiplicity of unit cells with at least one of the interconnection elements 60 disposed between each pair of adjacent unit cells of the stack, while leaving at least one edge 25 of each of the unit cells free to move; and (S50) affixing each unit cell 20 in the stack by connecting interconnection elements 60 to each unit cell 20. Stack 10 is placed (S60) in a fixture 75. Fixture 75 may be housed in a housing 70. The assembling step (S30) may performed by the step (S40) of disposing the unit cells 20 in a staggered configuration. One way of assembling the stack of unit cells 20 is by disposing each interconnection element 60 near one edge of each unit cell; then at least one distal edge 25 of each unit cell is free to move. If alternate free ends 25 extend in opposite directions, the unit cells 20 will be staggered. This is one configuration in which unit cells 20 are cantilevered from interconnection elements 60. Affixing step (S50) may be performed by compressing the stack of unit cells 20 (compression bonding). Alternatively, various other methods of bonding known in the art may be employed, such as brazing, welding, wire- bonding, ultrasonic bonding, or soldering.

Industrial Applicability

Although the foregoing has been a description and illustration of specific embodiments of the invention, various modifications and changes can be made thereto by persons skilled in the art without departing from the scope and spirit of the invention as defined by the following claims. For example, if the thermal expansion of each unit cell is anisotropic, the interconnection elements 60 and internal slots of the trays 90 may be disposed to direct maximum expansion into the direction of the trays' internal slots. Similarly, several interconnection elements 60 may be disposed so that they share the load of supporting an individual unit cell. The interconnection elements 60 may be disposed proximate to one edge of each unit cell, for example.

What is claimed is:

1. A fuel-cell assembly comprising:
   a) a plurality of unit cells, each of said unit cells comprising an anode, an electrolyte, a cathode, and a current collector, and each of said unit cells having at least one edge, said unit cells being arranged in a stack; and
   b) a plurality of electrical interconnection elements, at least one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements.

2. The fuel-cell assembly of claim 1, wherein each of said unit cells has at least two edges free to move relative to said electrical interconnection elements.

3. The fuel-cell assembly of claim 1, wherein each of said unit cells has at least three edges free to move relative to said electrical interconnection elements.

4. The fuel-cell assembly of claim 1, wherein each of said unit cells has four edges free to move relative to said electrical interconnection elements.

5. The fuel-cell assembly of claim 1, wherein each of said unit cells has an operable range of thermal expansion and said at least one edge free to move relative to said electrical interconnection elements remains free to move throughout the operable range of thermal expansion.

6. The fuel-cell assembly of claim 1, wherein each of said unit cells is cantilevered from said electrical interconnection elements by which it is mechanically supported.

7. The fuel-cell assembly of claim 1, wherein each unit cell is adjacent to at least one other unit cell and wherein at least one of said electrical interconnection elements is disposed between the unit cells of each pair of adjacent unit cells.

8. The fuel-cell assembly of claim 7, wherein said at least one of said electrical interconnection elements disposed between the unit cells of each pair of adjacent unit cells is shared by said adjacent unit cells.

9. The fuel-cell assembly of claim 1, wherein each of said plurality of electrical interconnection elements is substantially aligned with at least one other electrical interconnection element of said plurality of electrical interconnection elements.

10. The fuel-cell assembly of claim 1, wherein at least one of said electrical interconnection elements by which said unit cells are mechanically supported is electrically connected to said current collector.

11. The fuel-cell assembly of claim 1, wherein each of said plurality of electrical interconnection elements comprises a conductive bond selected from the list consisting of a ball bond, a bond pad, a pin, a clip, a nail-head bond, a wire bond, an ultrasonic bond, a solder bond, a controlled-collapse bond, a surface-mount bond, a brazed bond, a compression bond, and a welded bond.

12. The fuel-cell assembly of claim 1, wherein each of said plurality of electrical interconnection elements comprises a conductive pin.

13. A fuel-cell assembly comprising:
 a) a plurality of unit cells, each of said unit cells comprising an anode, an electrolyte, a cathode, and a current collector, and each of said unit cells having at least one edge, said unit cells being arranged in a stack; and
 b) a plurality of electrical interconnection elements, at least one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements, and wherein each of said plurality of electrical interconnection elements comprises a conductive pin, each unit cell having at least one opening for said conductive pin and said conductive pin being disposed in said opening.

14. The A fuel-cell assembly comprising:
 a) a plurality of unit cells, each of said unit cells comprising an anode, an electrolyte, a cathode, and a current collector, and each of said unit cells having at least one edge, said unit cells being arranged in a stack; and
 b) a plurality of electrical interconnection elements, at least one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements, and wherein said unit cells are staggered such that adjacent unit cells extend alternately in opposite directions from said electrical interconnection elements by which said unit cells are mechanically supported.

15. A fuel-cell assembly comprising in combination:
 a) a plurality of unit-cell means for generating electric current, each of said unit-cell means comprising an anode, an electrolyte, a cathode, and a current collector, said unit-cell means being arranged in a stack;
 b) a plurality of means for electrically interconnecting said unit-cell means, at least one electrical interconnecting means being connected respectively to each anode and to each cathode of said unit-cell means, said unit-cell means being mechanically supported by said means for electrically interconnecting such that each of said unit-cell means has at least one edge free to move relative to said means for electrically interconnecting.

16. The fuel-cell assembly of claim 15, wherein each of said unit-cell means has an operable range of thermal expansion and said at least one edge free to move relative to said electrical interconnecting means remains free to move throughout the operable range of thermal expansion.

17. A method for fabricating a fuel-cell assembly, said method comprising the steps of:
 a) providing a multiplicity of fuel-cell unit cells, each fuel-cell unit cell comprising an anode, an electrolyte, a cathode, and a current collector;
 b) providing electrical interconnection elements adapted to connect electrically to said anode, cathode, and current collector of each of the unit cells;
 c) assembling a stack by stacking the multiplicity of unit cells with at least one of said electrical interconnection elements disposed between each pair of adjacent unit cells of the stack, while leaving at least one edge of each of said unit cells free to move relative to said electrical interconnection elements; and
 d) affixing each unit cell in the stack by connecting said electrical interconnection elements to each unit cell.

18. A fuel-cell assembly comprising:
 a) a plurality of unit cells, each of said unit cells comprising an anode, an electrolyte, a cathode, and a current collector, and each of said unit cells having at least one edge, said unit cells being arranged in a stack; and
 b) a plurality of electrical interconnection elements, each comprising a ball bond, at least one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements.

19. The fuel-cell assembly of claim 18, wherein each of said ball bonds comprises a gold ball.

20. A fuel-cell assembly comprising:
 a) a plurality of unit cells, each of said unit cells comprising an anode, an electrolyte, a cathode, and a current collector, and each of said unit cells having at least one edge, said unit cells being arranged in a stack; and
 b) a plurality of electrical interconnection elements, at least one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements, and wherein each of said plurality of electrical interconnection elements comprises a conductive pin, each unit cell has at least one opening for said conductive pin, and said conductive pin is disposed in said opening.

21. A fuel-cell assembly comprising:
 a) a plurality of unit cells, each of said unit cells comprising an anode, an electrolyte, a cathode, and a current collector, and each of said unit cells having at least one edge, said unit cells being arranged in a stack;
 b) a plurality of electrical interconnection elements, at least one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements; and
 c) a number of trays and a fixture adapted to receive the trays, each of said trays being adapted to receive at least a portion of a unit cell including said at least one edge that is free to move relative to said electrical interconnection elements, and each of said trays having an opening for each of said electrical interconnection elements of the unit cell.

22. The fuel-cell assembly of claim 21, wherein each of said edges of each unit cell that is free to move relative to said electrical interconnection elements is movably disposed in one of said trays of said fixture.

23. The fuel-cell assembly of claim 21, wherein each of said trays is adapted to allow lateral motion of said edge of said unit cell that is free to move relative to said electrical interconnection elements, said lateral motion occurring substantially parallel to a lateral plane, and wherein each of said trays is adapted to limit bending and motion of said unit cell out of said lateral plane.

24. A method for fabricating a fuel-cell assembly, said method comprising the steps of:
 a) providing a multiplicity of fuel-cell unit cells, each fuel-cell unit cell comprising an anode, an electrolyte, a cathode, and a current collector;
 b) providing electrical interconnection elements adapted to connect electrically to said anode, cathode, and current collector of each of the unit cells;
 c) assembling a stack by stacking the multiplicity of unit cells with at least one of said electrical interconnection elements disposed between each pair of adjacent unit cells of the stack, while leaving at least one edge of each of said unit cells free to move relative to said electrical interconnection elements;
 d) disposing said stack in a fixture having at least one tray for each unit cell;
 e) disposing at least a portion of each unit cell movably in a tray of said fixture; and
 f) affixing each unit cell in the stack by connecting said electrical interconnection elements to each unit cell.

25. The method of claim 24, wherein the steps are performed in the order recited.

26. The method of claim 24, wherein said assembling step c) is performed by disposing each interconnection element proximate to one edge of each unit cell, whereby at least a distal edge of each unit cell is free to move.

27. The method of claim 24, wherein said assembling step c) is performed by disposing said unit cells in a staggered configuration such that adjacent unit cells extend alternately in opposite directions from said electrical interconnection elements by which said unit cells are mechanically supported.

28. The method of claim 24, wherein said assembling step c) is performed by cantilevering each of said unit cells from said interconnection elements.

29. The method of claim 24, wherein each of said electrical interconnection elements is electrically connected to at least one of said anode, cathode, and current collector.

30. The method of claim 24, wherein each of said unit cells is mechanically supported by an interconnection element connected to at least one of said anode, cathode, and current collector.

31. The method of claim 24, wherein said affixing step f) is performed by compressing said stack.

32. The method of claim 24, wherein said portion of each unit cell disposed movably in a tray of said fixture includes said end free to move.

33. The method of claim 24, wherein each of said unit cells has an operable range of thermal expansion and said step of disposing at least a portion of each unit cell movably in a tray of said fixture includes disposing said portion such that said portion remains within said tray of said fixture throughout the operable range of thermal expansion.

34. A fuel-cell assembly fabricated by the method of claim 24.

35. A fuel-cell assembly comprising:
 a) a plurality of unit cells, each of said unit cells comprising a substrate, an anode, an electrolyte, a cathode, and a current collector, and each of said unit cells having at least one edge and at least one elongated stress-relief opening extending through a substrate surface of each unit cell, said unit cells being arranged in a stack; and
 b) a plurality of electrical interconnection elements, at feast one electrical interconnection element being electrically connected respectively to each anode and to each cathode of said unit cells, each of said unit cells being mechanically supported by at least one of said electrical interconnection elements such that said at least one edge of each of said unit cells is free to move relative to said electrical interconnection elements.

* * * * *

UNITED STATES PATENT AND TRADEMARK OFFICE
CERTIFICATE OF CORRECTION

PATENT NO. : 7,063,909 B2
APPLICATION NO. : 10/350467
DATED : June 20, 2006
INVENTOR(S) : David Champion et al.

Page 1 of 1

It is certified that error appears in the above-identified patent and that said Letters Patent is hereby corrected as shown below:

In column 7, line 22, in Claim 14, delete "The".

In column 10, line 32, in Claim 35, delete "feast" and insert -- least --, therefor.

Signed and Sealed this

Eighth Day of December, 2009

David J. Kappos
*Director of the United States Patent and Trademark Office*